United States Patent [19]
Edwards

[11] Patent Number: 5,413,830
[45] Date of Patent: May 9, 1995

[54] DOCUMENT SHEET WITH RECESSED CAVITY AND OBJECT RECEIVED THEREIN

[76] Inventor: Paul R. Edwards, 235 Greenbriar Estates Dr., St. Louis, Mo. 63122

[21] Appl. No.: 36,902

[22] Filed: Mar. 25, 1993

[51] Int. Cl.⁶ ............................................. B32B 3/00
[52] U.S. Cl. ................................. 428/40; 206/0.8; 283/81; 428/41; 428/43; 428/63; 428/67; 428/156; 428/174; 428/192; 428/213; 428/220; 428/542.2; 428/542.4; 462/6
[58] Field of Search ............... 428/40, 41, 42, 43, 428/67, 131, 63, 174, 156, 192, 213, 220, 542.2, 13, 542.4; 462/6; 206/0.8, 0.81, 0.84, 562, 563, 564, 565; 283/81

[56] References Cited

U.S. PATENT DOCUMENTS

| | | | |
|---|---|---|---|
| 2,780,572 | 2/1957 | Carlson | 156/299 |
| 3,322,441 | 5/1967 | Eichorn | 281/5 |
| 4,277,089 | 7/1981 | Lockhart | 283/6 |
| 4,379,573 | 4/1983 | Lomeli et al. | 428/42 |
| 4,447,481 | 5/1984 | Holmberg | 428/40 |
| 4,551,374 | 11/1985 | Holmberg | 428/43 |
| 4,799,712 | 1/1989 | Biava et al. | 283/81 |
| 4,890,862 | 1/1990 | Buchholz | 283/62 |
| 5,096,229 | 3/1992 | Carlson | 283/75 |
| 5,131,686 | 7/1992 | Carlson | 283/75 |
| 5,320,387 | 6/1994 | Carlson | 283/75 |

FOREIGN PATENT DOCUMENTS

WO92/05036 4/1992 WIPO.

*Primary Examiner*—Nasser Ahmad
*Attorney, Agent, or Firm*—Rogers, Howell & Haferkamp

[57] ABSTRACT

The present invention pertains to a document sheet or a business form formed as a single sheet or part of a continuous web of interconnected sheets where an indentation is pressed into a front surface of the sheet and an object such as a card, label or coin is releasably adhered to the sheet in the indentation, whereby recessing the object in the sheet indentation enables the simultaneous printing of both the document sheet and object.

16 Claims, 1 Drawing Sheet

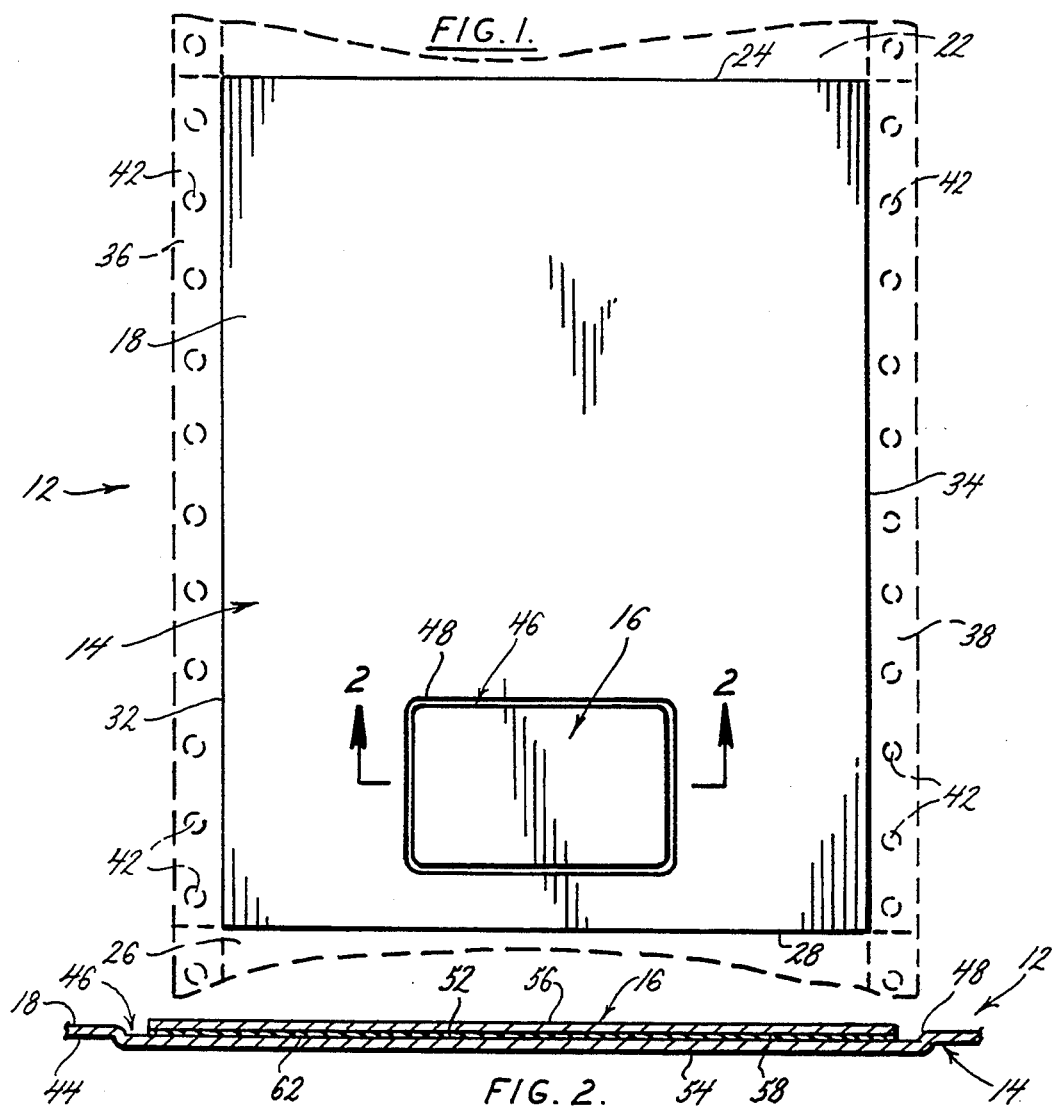
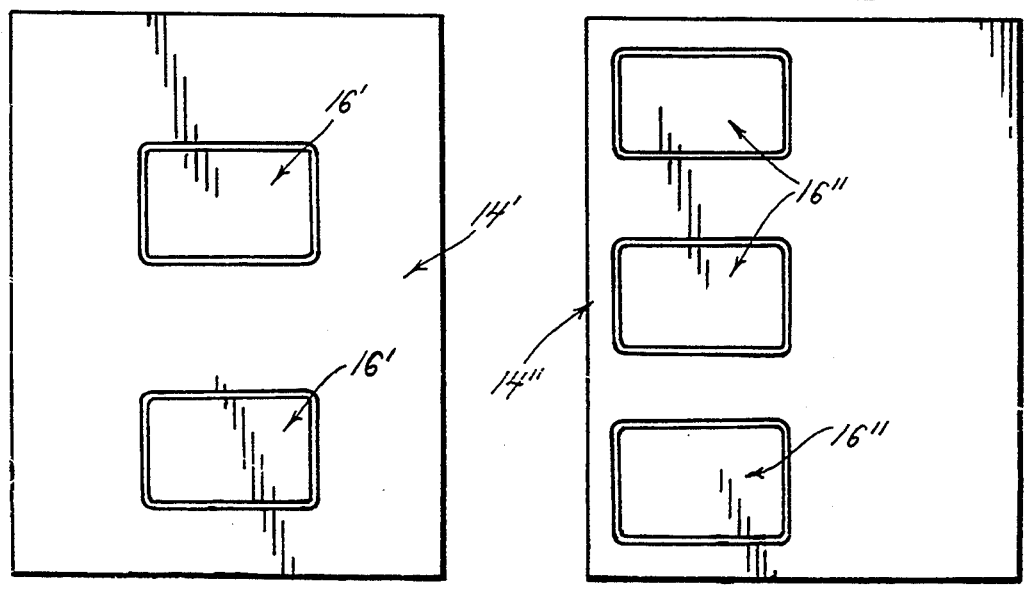

DOCUMENT SHEET WITH RECESSED CAVITY AND OBJECT RECEIVED THEREIN

BACKGROUND OF THE INVENTION (1) Field of the Invention

The present invention pertains to a document sheet or a business form that is formed as a single sheet or part of a continuous web of interconnected sheets, where an indentation(s) are pressed into a front surface of the sheet and an object, such as a card, label or coin, is releasably adhered to the sheet in the indentation enabling the simultaneous printing of both the document sheet and object.

(2) Description of the Related Art

It is well known in the prior art to provide document sheets and business forms with removable labels and cards adhered to the sheets and forms. The various different types of sheets and forms with adhered cards range from business forms with removable, adhesive free data cards secured to the front surface of the forms such as that disclosed in U.S. Pat. No. 4,890,862, to business forms with removable, self-stick labels fabricated within the thickness of the forms as disclosed in U.S. Pat. No. 4,379,573.

Prior art document sheets and business forms of the type having data cards adhered to their front surfaces have been found to be disadvantaged in that the projecting height or thickness of the data card from the front surface of the sheet will at times cause the sheet to jam in a printing apparatus. Business forms and document sheets of the type where a self-adhesive label is fabricated within the thickness of the sheet often require the addition of an underlayment beneath the self-stick label. The cost of the underlayment and its attachment to the underside of the label and sheet contribute significantly to the overall cost of the document sheet.

SUMMARY OF THE INVENTION

The document sheet of the present invention avoids the above set forth disadvantages of prior art document sheets and business forms by providing a document sheet with a removably attached object thereon having simplified, inexpensive construction and having a reduced cross sectional thickness enabling use of the sheet in printers without the risk of jamming the printer.

The document sheet of the present invention is basically comprised of a sheet of material, preferably paper stock, having an indentation recessed in its front surface and an object secured in the indentation. The sheet material is continuous within the peripheral boundaries of the sheet. In variant embodiments, the document sheet is provided as a single sheet, and as a sheet of a continuous web of sheets wherein each individual sheet is separated by a transverse frangible line such as a perforation line. The individual sheets of the continuous web of sheets may also be provided with left and right side margins separated from the document sheets by frangible lines such as perforation lines and having pluralities of tractor holes provided therein as a conventional continuous web of computer printer paper.

The indentation(s) in the front surface of the sheet is formed by compressing the material of the sheet from the front surface down into the thickness of the sheet. The configuration of the indentation may vary to complement the configuration of an object to be adhered to the sheet in the indentation. The depth of the penetration of the indention into the document sheet and the thickness of the object to be adhered to the sheet in the indentation may vary depending on the thickness of the stock material employed in constructing the sheet.

The object is adhered within the indentation on the indentation surface of the sheet. Preferably, the object is releasably adhered in the indentation to permit its easy removal from the sheet. The thickness of the object is at least as large as the distance of the indentation into the sheet thickness from the sheet top surface. This is to enable both the front surface of the document sheet and the front surface of the object to be simultaneously printed when running the document sheet through a printer. Alternatively, an object having a greater thickness than the distance of penetration of the indentation into the thickness of the document sheet may be employed. With the object being adhered to the indentation surface, a portion of the object's thickness is recessed into the indentation depth so that only a fraction of the object's thickness projects above the front surface of the sheet. This reduces the projection of the object from the front surface of the sheet and lessens the risk of the sheet and object jamming a conventional printer than heretofore has been available with prior art document sheets having cards affixed to their front surfaces. By forming the indentation in the sheet front surface by compressing the material of the sheet, the document sheet of the invention may be produced more economically than prior art document sheets and business forms comprising underlayment layers beneath cards or labels cut into the thickness of the document sheet.

BRIEF DESCRIPTION OF THE DRAWINGS

Further objects and features of the present invention are revealed in the following detailed description of the preferred embodiments of the invention and in the drawing figures wherein:

FIG. 1 is a view of the front surface of the document sheet and affixed object of the present invention;

FIG. 2 is a partial view, in section, of the document sheet taken along the line 2—2 of FIG. 1;

FIG. 3 is a front view of an alternative embodiment of the document sheet of the invention; and FIG. 4 is a front view of a still further embodiment of the document sheet of the present invention.

DETAILED DESCRIPTION OF THE PREFERRED EMBODIMENTS

FIGS. 1 and 2 show the document sheet 12 of the present invention constructed in accordance with the method of the present invention. The document sheet is basically comprised of a sheet of material 14 and an object 16 adhered to the front surface 18 of the sheet. The sheet of material 14 is shown in solid lines in FIG. 1 as a single sheet. However, in variant embodiments of the invention, the sheet of material 14 may be one of a continuous web of material sheets with a second 22 and additional like sheets connected along a top peripheral edge 24 of the sheet and a third 26 and additional like sheets connected along a bottom peripheral edge 28 of the sheet. The variant embodiment of the sheet in which it is one sheet of a continuous web is represented in dashed lines in FIG. 1. The top peripheral edge 24 connecting the sheet 14 to the second sheet 22 may be a frangible edge such as a fold line or a line of perforations that facilitate the separation of the two sheets along the line. Likewise, the bottom peripheral edge 28 of the sheet provides a frangible connection between the sheet 14 and the third sheet 26 with the frangible connection being provided by a fold line or a line of perforations. In a still further variant embodiment of the invention, the left 32 and right 34 peripheral edges of the document sheets may be frangible connections to left 36 and right 38 margins with tractor holes 42 provided therethrough as in conventional computer printer paper. The material of the sheet is continuous within the sheet peripheral edge, meaning that there are no holes or areas of different materials within the sheet's peripheral edge. Although not shown, in variant embodiments the sheet 14 may also be provided with fold lines or tear lines within the peripheral edges 24, 28, 32, 34 of the sheet. The material of the sheet 14 is preferably paper stock and the thickness of the sheet between the front surface 18 and back surface 44 of the sheet may vary depending on the particular application desired for the document sheet.

An indentation 46 is provided in the front surface of the sheet. As shown in FIG. 1, the indentation 46 has a rectangular configuration conforming to the rectangular configuration of the object 16. However, the configuration of the indentation boundary 48 may take on a variety of shapes complementary to the configuration of a particular object to be secured to the front surface of the sheet. At the bottom of the indentation 46 is an indentation surface 52 of the sheet recessed below the sheet front surface 18 and into the thickness of the sheet by a desired distance, the distance being dependent on the thickness of the sheet material and the thickness of the object to be adhered to the sheet front surface. According to the method of the invention, the indentation 46 is formed into the thickness of the sheet 14 by pressing the material of the sheet, for example by using a conventional rotary press. It can also be seen in FIG. 2 that by forming the indentation 46 into the thickness of the sheet 14, a projecting surface 54 is formed in the sheet back surface 44 projecting about the same distance from the back surface that the indentation surface 52 extends into the sheet thickness from the front surface 18, there being a slight difference in these differences due to compression of the sheet material forming the indentation surface 52.

In the illustrative example shown in the drawing figures, the object 16 to be adhered to the sheet front surface 18 is a rectangular identification card. However, various different types of objects may be employed with the document sheet of the invention. For example, self-adhesive labels, coins, tokens, keys, and a variety of different types of objects may be adhered to the front surface of the sheet in the indentation 46, the only requirement being that the objects have a limited thickness. The object 16 has a top surface 56 and a bottom surface 58, with the bottom surface being adhered to the indentation surface 52. An adhesive 62 is employed to secure the object bottom surface 58 to the indentation surface 52. The adhesive may be applied to the object bottom surface or the indentation surface prior to the object being received in the indentation and pressed against the indentation surface. The adhesive 62 may be a permanent adhesive, or preferably may be a releasable adhesive, enabling the object 16 to be easily removed from the indentation surface 52 and the document sheet 14 when so desired.

It can be seen in FIG. 2 that by forming the indentation 46 into the front surface 18 of the sheet, the thickness or the projecting height that the object 16 would project above the sheet front surface 18 is lessened by the distance that the indentation surface 52 is recessed into the thickness of the document. Any additional distance that the object thickness would project above the sheet front surface 18 if it were not received in the indentation 46 is the distance that the projection surface 54 of the sheet projects from the sheet back surface 44, less the change in sheet thickness due to compression of the sheet material when the indentation is formed. In this manner, the document sheet of the present invention distributes the thickness of the object 16 adhered to the sheet 14 between the front surface 18 and back surface 44 of the sheet so that the object 16 may be adhered to the sheet 14 while presenting a very small protuberance from the sheet front surface 18 and back surface 44. Distributing the thickness of the object on the front and back surfaces of the sheet enables the document sheet of the invention to provide an inexpensive document having an attached object, the both of which can be printed simultaneously by a conventional printer without risking jamming the printer.

Although the document sheet and method of the invention are described above with reference to only a single object 16 adhered in the indentation 46 of the sheet 14, it should be understood that a plurality of objects may be secured in indentations in a variety of positions of the indentations on the document sheet. Some possible variations are illustrated in FIGS. 3 and 4 where like component parts have like reference numerals followed by a prime (') in FIG. 3 and a double prime (") in FIG. 4. The variant document sheets of FIGS. 3 and 4 are constructed in the same manner as the first described embodiment shown in FIGS. 1 and 2.

While the present invention has been described by reference to a specific embodiment, it should be understood that modifications and variations of the invention may be constructed without departing from the scope of the invention defined in the following claims.

What is claimed is:

1. A document sheet comprising:
    a sheet of paper material having a front surface and a back surface and having a peripheral edge and a first thickness between the front and back surfaces;
    an indentation formed by compressing in the sheet front surface, the indentation having an indentation surface recessed a first distance into the sheet thickness from the front surface, the indentation being completely surrounded by a portion of the sheet having the first thickness, said paper sheet is continuous within the peripheral edge; and
    an object having a first surface and a second surface and a second thickness that is at least equal to the first distance, the object being received within the indentation and the second surface of the object being removably secured to the indentation surface.

2. The document sheet of claim 1, wherein:
    at least a portion of the peripheral edge is a frangible edge, and the frangible edge connects the document sheet to a second, like document sheet.

3. The document sheet of claim 1, wherein:
    the object second surface is secured to the indentation surface by an adhesive that enables the object to be separated from the indentation surface and the document sheet.

4. The document sheet of claim 1, wherein:
    a plurality of fold lines are formed at the peripheral edge in the document sheet.

5. The document sheet of claim 1, wherein:

a plurality of tear lines are formed at the peripheral edge in the document sheet.

6. The document sheet of claim 1, wherein:
the sheet front surface is flat except for the indentation formed in the sheet front surface.

7. The document sheet of claim 1, wherein:
a peripheral edge surrounds the front and back surfaces of the sheet, the peripheral edge being a frangible edge with opposite top and bottom frangible edge portions and opposite left and right frangible edge portions, the top and bottom frangible edge portions connect the document sheet to second and third like document sheets, respectively, and the right and left frangible edge portions connect the document sheet to right and left margins with pluralities of tractor holes therethrough.

8. The document sheet of claim 3, wherein:
the object is an identification card.

9. The document sheet of claim 3, wherein:
the object is a coin token.

10. The document sheet of claim 3, wherein:
the object is a label.

11. A document sheet comprising:
a sheet of paper material having a front surface and a back surface and having a peripheral edge;
an indentation formed by compressed in the sheet front surface, the indentation having an indentation surface recessed a first distance into the sheet front surface, said indentation being completely surrounded by a portion of the sheet and said sheet is continuous within the peripheral edge;
a projection formed in the sheet back surface by the indentation, the projection having a projection surface protruding a second distance from the sheet back surface, the second distance being substantially equal to the first distance; and
an object having a first surface, a second surface, and a thickness that is at least equal to the first distance, the object being received within the indentation with the second surface of the object being removably secured to the indentation surface.

12. The document sheet of claim 11, wherein:
at least a portion of the peripheral edge is a frangible edge, and the frangible edge connects the document sheet to a second, like document sheet.

13. The document sheet of claim 11, wherein:
the object second surface is secured to the indentation surface by an adhesive that enables the object to be separated from the indentation surface and the document sheet.

14. The document sheet of claim 13, wherein:
the object is an identification card.

15. The document sheet of claim 11, wherein:
a plurality of fold lines are formed at the peripheral edge in the document sheet.

16. The document sheet of claim 11, wherein:
a peripheral edge surrounds the front and back surfaces of the sheet, the peripheral edge being a frangible edge with opposite top and bottom frangible edge portions and opposite left and right frangible edge portions, the top and bottom frangible edge portions connect the document sheet to second and third like document sheets, respectively, and the right and left frangible edge portions connect the document sheet to right and left margins with pluralities of tractor holes therethrough.

* * * * *